United States Patent [19]

Godlove

[11] Patent Number: 5,034,757

[45] Date of Patent: Jul. 23, 1991

[54] LED PRINTING ARRAY CURRENT CONTROL

[75] Inventor: Ronald E. Godlove, Rochester, N.Y.

[73] Assignee: Xerox Corporation, Stamford, Conn.

[21] Appl. No.: 415,515

[22] Filed: Oct. 2, 1989

[51] Int. Cl.[5] .............................................. H04N 1/21

[52] U.S. Cl. ................................ 346/107 R; 358/296

[58] Field of Search .................. 346/108, 107 R, 160, 346/76 L; 358/296; 355/202

[56] References Cited

U.S. PATENT DOCUMENTS

| | | | |
|---|---|---|---|
| 4,424,524 | 1/1984 | Daniele | 346/160 |
| 4,553,148 | 11/1985 | Behrens et al. | 346/107 R |
| 4,587,717 | 5/1986 | Daniele et al. | 29/569 |
| 4,689,694 | 8/1987 | Yoshida | 346/107 R |
| 4,731,673 | 3/1988 | Yamakawa | 346/160 |
| 4,751,654 | 6/1988 | Lyyra | 364/482 |
| 4,752,806 | 6/1988 | Haas et al. | 355/202 |

*Primary Examiner*—Mark J. Reinhart

[57] ABSTRACT

An image write bar has a plurality of LEDs arranged in a linear array. The output of the LEDs is optimized by controlling current flow through each LED via a distributed or discrete resistive network. The current flow through each LED is dependent upon whether the LED is in isolation or in combination with original LEDs. The resistor network ensures that the inactivated LED output are all at a constant level.

3 Claims, 2 Drawing Sheets

LED PRINTING ARRAY CURRENT CONTROL

BACKGROUND AND INFORMATION DISCLOSURE STATEMENT

The present invention relates to a LED (Light Emitting Diode) array and more particularly to a method and means for improving output exposure uniformity by controlling the current flow to in between individual LEDs.

LEDs form part of a broader class of devices termed "optical image bars" characterized by forming an array of optical pixel emitters into an array. The array is capable of converting a spatial pattern, usually represented by the information content of electrical input signals, into a corresponding optical exposure pattern. Although there are a variety of applications for these devices, LED arrays have significant application in electrophotographic copiers and printers where they are used, for example, to write images on a photosensitive recording member and for editing/annotating and for erasing charge along selective areas of the recording member. Some exemplary prior art patents disclosing LED light bars in a xerographic printing environment are described in U.S. Pat. Nos. 4,424,524 and 4,752,806. In another patent, U.S. Pat. No. 4,587,717 there is described a light bar having a row of LEDs, the row length being designed to at least equal the effective width of the photoconductor to be written on. As disclosed in this patent, the number of LEDs per increment of length is determinative of the image resolution achieved. It has been found that to design and implement an LED image bar and other types of optical imaging systems a certain amount of "cross-talk" between adjacent LEDs is required in order to obtain adequate exposure at the image plane. This cross-talk between the pixel generators will provide the desired exposure most of the time, but suffers from inadequate exposure when, for example, a single pixel is addressed, but not the neighboring pixels. For example, the light emitted from a single pixel generator (LED) will typically be as low as 50 to 90 per cent of that level of exposure resulting when three or more adjacent pixels are emitting light.

This non-uniformity problem is inherent in prior art LED write bars because of the design of the drive circuits used with the LED array. FIG. 1 shows a schematic diagram of a conventional drive circuit for an LED array of the type shown in U.S. Pat. No. 4,587,717. Four LEDs are illustrated to simplify the description although many more LEDs are typically used. Each LED has an associated driver transistor ($Q_1$-$Q_4$) and a resistor connected in series ($R_1$-$R_4$). When any of the driver transistors is supplied with forward bias for their base/emitter junction, current flows through the resistor network, the LED and the transistor collector emitter/junction. Current flow through each LED is largely determined by the value of the emitting resistance and the applied voltage V+, V−. With this circuit, and assuming LED 3 is addressed, each diode shares some current flow from its neighbors assuming LED 1 to 3 are addressed. Each diode shares some current flow of its neighbors and its light output is higher than if only one of the pixels were energized.

According to a first aspect of the invention, a distributed resistance element is placed in series with the LED in order to reduce the current to any one LED if adjacent LEDs are also on. This results in each LED generating a uniform light output when addressed irrespective of how many pixels are "on".

It is known in the prior art to compensate for defective LEDs in an image bar by a redundant addressing technique (U.S. Pat. No. 4,751,654) and to compensate for LED non-uniformity by tailoring the physical dimensions of each LED according to a disclosed formula (U.S. Pat. No. 4,553,148). The compensating circuit used in the present invention is not, however, disclosed.

DESCRIPTION OF THE OF THE INVENTION

Figure 1:
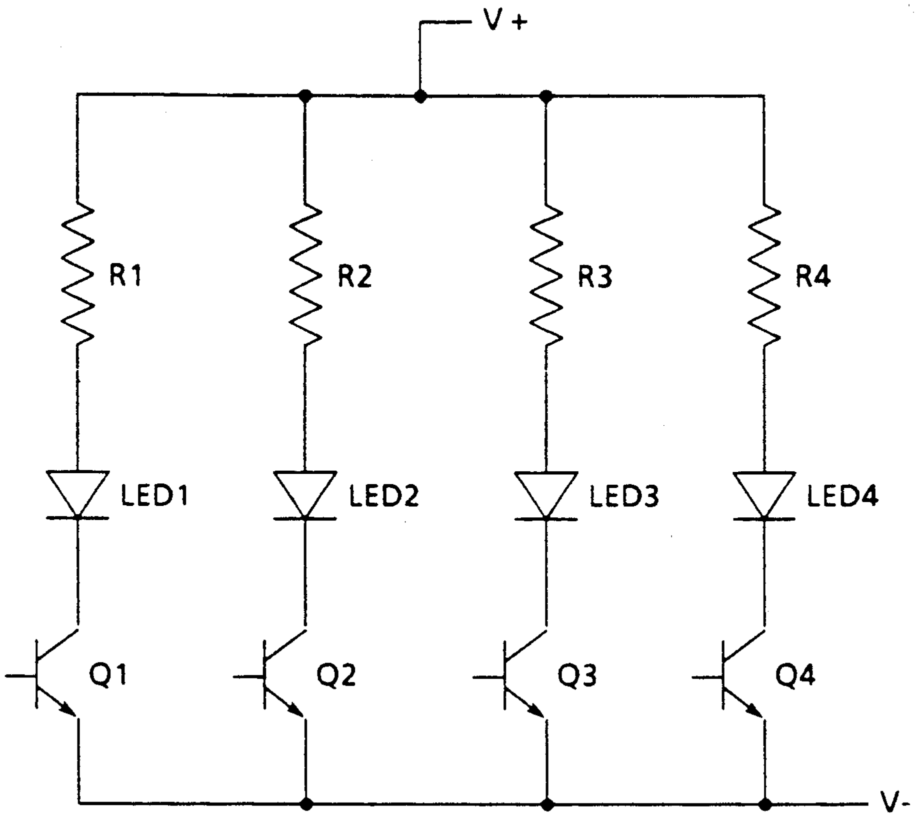
FIG. 1 PRIOR ART
FIG. 1 is a prior art LED array drive circuit schematic.
Figure 2:
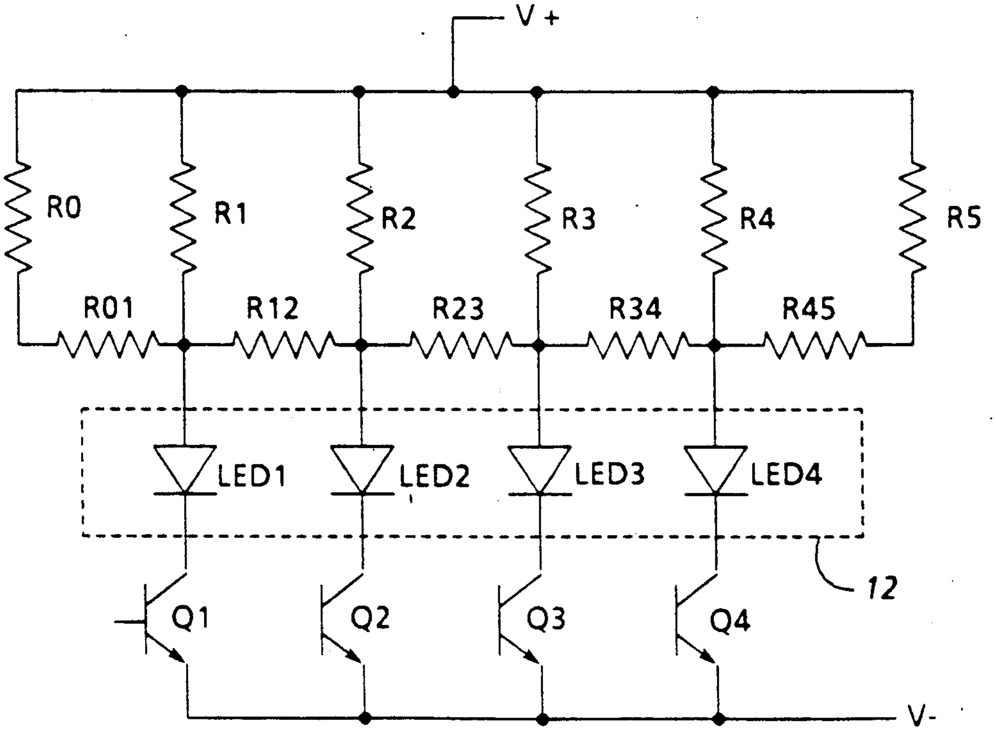
FIG. 2 is a schematic circuit diagram of an LED array utilizing discrete resistors in a distributed network.

FIG. 2 is a schematic diagram of an LED write bar array comprising a plurality of LEDS (only four of which are shown) arranged in a linear row 12. The array can be used, for example, as the write bar disclosed in U.S. Pat. No. 4,424,524 whose contents are hereby incorporated by reference. Each LED has an associated drive transistor $Q_1$-$Q_4$. Input signals through base emitter junctions of the transistors serves as the addressing (energizing) signal for the particular LED. The limiting resistance here, instead of the single resistance of the FIG. 1 circuit, is now combined to distribute resistance with each of the resistors RO-R5, and RO1-R45 in series with the LEDs. With this distributed resistance network, when adjacent LEDs are addressed the current to each addressed LED is reduced, but equal. Conversely, if only a single LED is addressed, a higher current flow will be induced. For instance, if LED 3 is addressed, current will be drawn through several paths of resistors (R3, R4, and R34, R2 and R3). If two adjacent LEDs LED 2 and LED 3 are driven, the current drawn by either will be less than that drawn by the LED when singly addressed. Fewer circuit paths are available to either (e.g., LED 3 will now share circuit path which include R2/R23 and R4/R34 resistors. If three LEDs are addressed (LED 2-4) LED 3 will draw current through resistor R3 only, reducing the otherwise boosted circuit and bringing the emitted light output into uniformity with that of LEDs 2 and 4. LEDs 2 and 4 have current paths along resistors RO/RO1/R1/R12/R2 and R4/R34/R3/R45.

Figure 3:
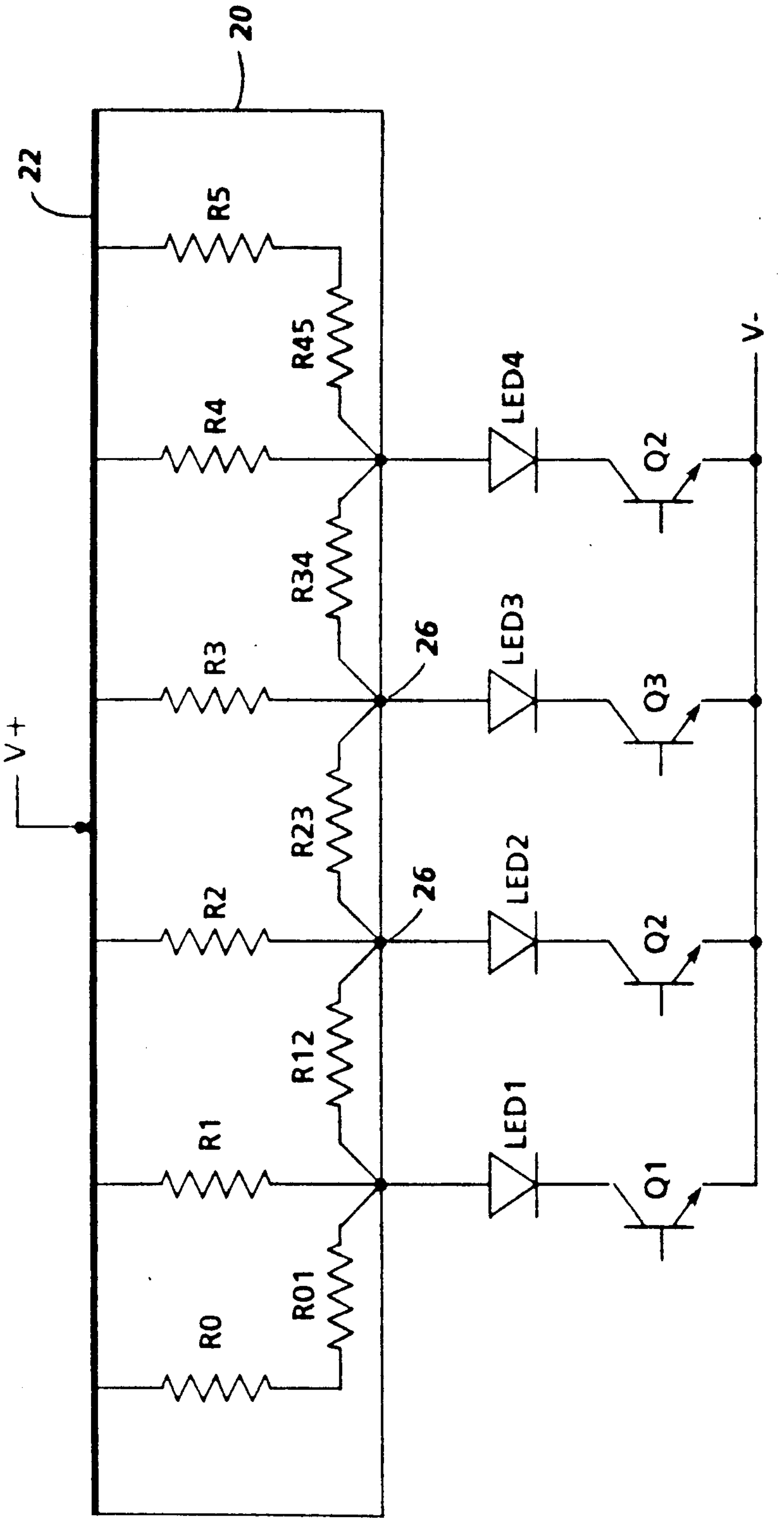
FIG. 3 is a schematic circuit diagram utilizing only a single resistive component in a distributed network scheme.

While making the output uniformity independent of the number and proximity of LEDs being addressed, the concept of FIG. 2 does increase the number of resistors and soldered connections required as compared to the FIG. 1 prior art embodiment. FIG. 3 demonstrates a second embodiment of the invention in which discrete resistors forming a distributed resistors network are replaced by a continuous resistive element electrically connected at contact points to each diode. As shown in FIG. 3 rectangle 20 represents the physical and electrical parameter of the distributed resistance. Bar 22 represents a continuous electrical contact to which bias voltage V+ is applied at a mid-point. LEDs 1-4 are connected to bar 22 via contact points 26. The individual resistors shown are for illustrative purposes and are not representative of discrete components, but rather of the resistive equivalents which exist between the resistor, the LED, the V+ node of the circuit. With this design only one resistive bar component (bar 22) is required and only N+1 contact points (soldered connections) 26 are required. The specific requirements for the design (resistive constant thickness of bar 22 LED/LED anode (contact spacing) and parallel spacing between the commom electrical contact, and the LED anode contacts) are within the capabilities of one skilled in the art.

While the invention has been described with reference to the structure disclosed, it is not confined to the specific details set forth, but is intended to cover such modifications or changes as may come within the scope of the following claims:

What is claimed is:

1. In image recorder which includes a plurality of light emitting diodes which are selectively energized in response to input signals and whose output exposes a photosensitive recording medium, an improved control circuitry for optimizing the illumination output of each individual LED, said control circuitry including:

means for selectively energizing individual LEDs, and resistive means for controlling current flow through said energized LEDs as a function of the energization of adjacent LEDs.

2. The image recorder of claim 1 wherein said resistive means includes a distribution network of resistors connected in series with said LEDs.

3. A drive circuit for an LED array comprising:

a plurality of LEDs, a plurality of driver transistors associted with each of said LEDs, means for applying a voltage across the LED array, means for selectively activating said driver transistors whereby current flow is initiated through each associated LED, and a distributed resistance circuit connected in series between said voltage application means and said LEDs whereby the current flow through each energized LED is controlled by plurality of resistors as a function of the energized state of adjacent LEDs.

* * * * *